US010581796B2

(12) United States Patent
Aluvala et al.

(10) Patent No.: US 10,581,796 B2
(45) Date of Patent: Mar. 3, 2020

(54) CONFIGURING NETWORK CONNECTIONS FOR COMPUTING DEVICES

(71) Applicant: AIRWATCH LLC, Atlanta, GA (US)

(72) Inventors: Suman Aluvala, Bangalore (IN); Mahesh Kavatage, Bangalore (IN); Pavan Rajkumar Rangain, Bangalore (IN); Niranjan Paramashivaiah, Bangalore (IN)

(73) Assignee: AIRWATCH LLC, Atlanta, GA (US)

( * ) Notice: Subject to any disclaimer, the term of this patent is extended or adjusted under 35 U.S.C. 154(b) by 174 days.

(21) Appl. No.: 15/229,141

(22) Filed: Aug. 5, 2016

(65) Prior Publication Data
US 2017/0302513 A1    Oct. 19, 2017

(30) Foreign Application Priority Data

Apr. 13, 2016  (IN) .............................. 201641013009

(51) Int. Cl.
*H04L 12/66* (2006.01)
*H04L 29/12* (2006.01)
*H04L 12/24* (2006.01)
*H04L 12/26* (2006.01)

(52) U.S. Cl.
CPC .......... *H04L 61/1511* (2013.01); *H04L 12/66* (2013.01); *H04L 41/0816* (2013.01); *H04L 43/0811* (2013.01); *H04L 43/10* (2013.01); *H04L 61/2015* (2013.01)

(58) Field of Classification Search
None
See application file for complete search history.

(56) References Cited

U.S. PATENT DOCUMENTS

| | | | | |
|---|---|---|---|---|
| 2007/0136514 A1* | 6/2007 | Roth | ..................... | G11C 15/00 711/108 |
| 2008/0046555 A1* | 2/2008 | Datta | ..................... | H04L 45/02 709/223 |
| 2009/0083406 A1* | 3/2009 | Harrington | ............. | G06F 15/16 709/222 |
| 2011/0200045 A1* | 8/2011 | Baehre | ................ | H04L 12/4633 370/392 |
| 2011/0310787 A1* | 12/2011 | Sheriff | .................. | H04W 76/15 370/315 |
| 2014/0157042 A1* | 6/2014 | Johnson | .............. | G06F 11/2002 714/4.11 |

(Continued)

*Primary Examiner* — Clayton R Williams
*Assistant Examiner* — Christopher B Robinson
(74) *Attorney, Agent, or Firm* — Thomas | Horstemeyer, LLP

(57) ABSTRACT

Examples relate to the configuration of network connections for computing devices. In some examples, a computing device determines that a network is inaccessible through a first network connection provided by a network access node. The computing device determines that the network is accessible through a first computing device that provides a second connection to the network. The computing device generates gateway configuration data for a second computing device based on an address for the first computing device. The computing device transmits the gateway configuration data to the second computing device to cause the second computing device to use the first computing device as a gateway.

20 Claims, 11 Drawing Sheets

(56) References Cited

U.S. PATENT DOCUMENTS

| | | | | |
|---|---|---|---|---|
| 2014/0241187 A1* | 8/2014 | Barkay | ............... | H04W 76/23 |
| | | | | 370/252 |
| 2014/0258415 A1* | 9/2014 | L'Heureux | ......... | H04L 67/1061 |
| | | | | 709/205 |
| 2015/0280970 A1* | 10/2015 | Heda | .................. | H04N 7/147 |
| | | | | 714/4.11 |
| 2016/0164787 A1* | 6/2016 | Roach | ................ | H04L 47/125 |
| | | | | 370/235 |
| 2016/0192404 A1* | 6/2016 | Naidu | ................ | H04W 28/18 |
| | | | | 370/329 |
| 2017/0195374 A1* | 7/2017 | Vu | ..................... | H04L 65/403 |

* cited by examiner

CONFIGURING NETWORK CONNECTIONS FOR COMPUTING DEVICES

RELATED APPLICATION

Benefit is claimed under 35 U.S.C. 119(a)-(d) to Foreign Application Serial No. 201641013009 filed in India entitled "CONFIGURING NETWORK CONNECTIONS FOR COMPUTING DEVICES", filed on Apr. 13, 2016, by AIRWATCH LLC, which is herein incorporated in its entirety by reference for all purposes.

BACKGROUND

Multiple computing devices can form a local area network (LAN) in which the computing devices can communicate with each other. A network switch in the LAN can facilitate communication between the computing devices using wired and wireless communication protocols, such as protocols based on the IEEE 802.3 Ethernet and IEEE 802.11 wireless LAN (WLAN) standards.

The network switch in a LAN can be in communication with a wide area network (WAN) access point, such as a router or a modem, providing a connection that facilitates the computing devices communicating with devices outside of the LAN. However, if the WAN connection is unavailable, the computing devices may be unable to communicate with devices outside of the LAN.

When the WAN connection is unavailable, a computing device can tether to another computing device that has network access through an alternative connection, such as through a cellular telephony network. However, tethering typically involves wired or wireless communication in which the maximum distance between the devices is limited.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
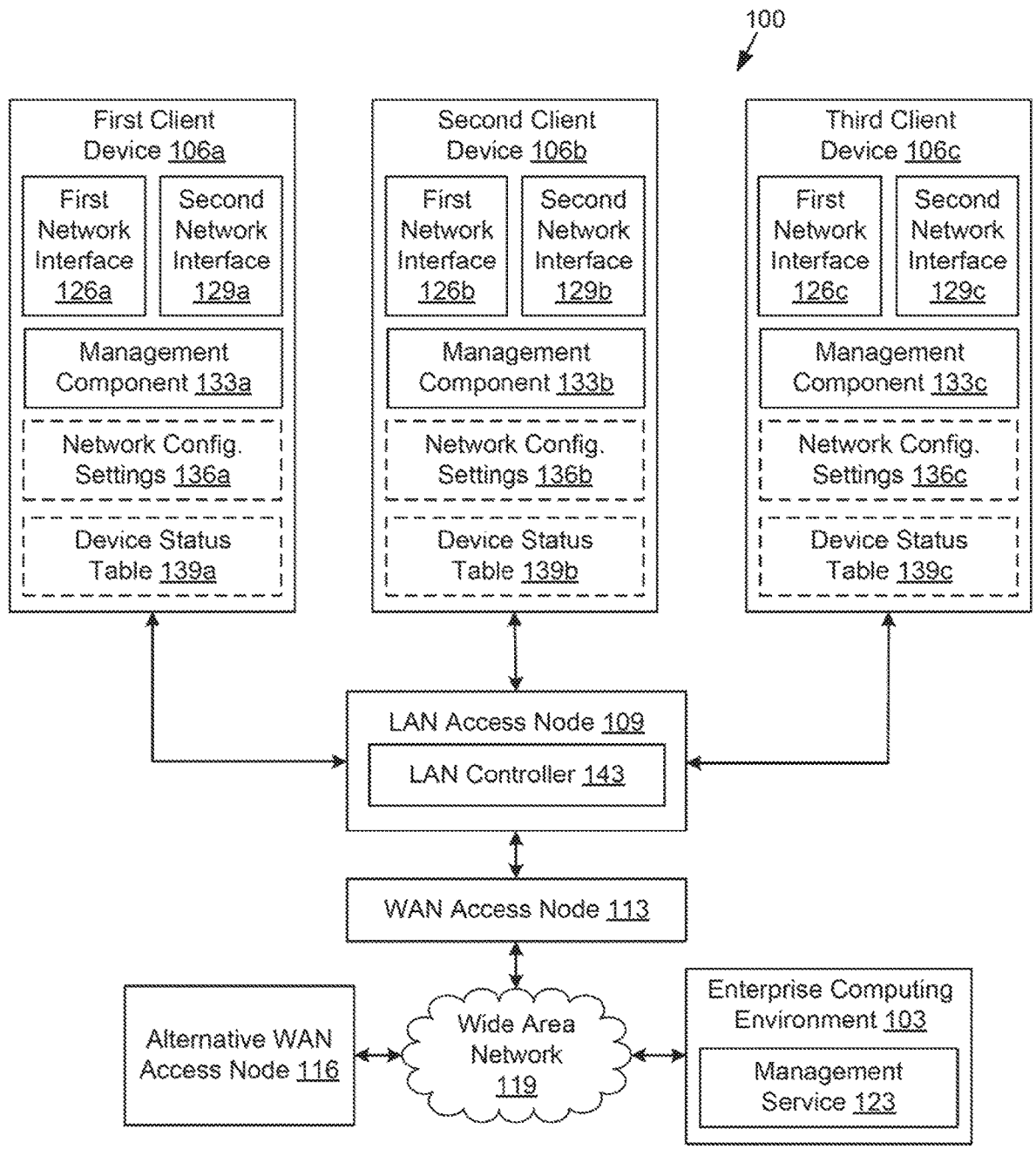
FIGS. 1A-1B are drawings of examples of a networked environment.

The present disclosure relates to the configuration of network connections for computing devices. In one example, a local area network (LAN) access node, such as a network hub, can facilitate communication between multiple computing devices in a LAN. The LAN access node can detect that a wide area network (WAN) connection provided by a WAN access node, such as a cable modem, is unavailable. In response, the LAN access node can identify a computing device within the LAN that has access to the WAN through an alternative WAN connection. The LAN access node can then update network configuration data for the computing devices in the LAN so that their specified gateways become the computing device that has access to the WAN through the alternative connection.

In another example, one of the computing devices within the LAN can be selected to be a moderator. When the WAN connection provided by the WAN access node becomes unavailable, the moderator can identify a computing device within the LAN that has access to the WAN through an alternative WAN connection. The moderator can then update network configuration data for the computing devices in the LAN so that their specified gateways become the computing device that has access to the WAN through the alternative connection.

In the following discussion, examples of systems and their components are described, followed by examples of the operation of those systems.

With reference to FIG. 1, shown is an example of a networked environment 100. The networked environment 100 can include an enterprise computing environment 103, client devices 106a-106c, a LAN access node 109, a WAN access node 113, and an alternative WAN access node 116 in data communication through a wide area network 119. The wide area network 119 can include wired networks and wireless networks. For example, the wide area network 119 can include satellite networks, cable networks, Ethernet networks, cellular networks, and telephony networks. The wide area network 119 in some examples can be regarded as being the Internet.

The enterprise computing environment 103 can be a computing system operated by one or more enterprises, such as a business or other organization. The enterprise computing environment 103 can include a computing device, such as a server computer, that can provide computing capabilities. Alternatively, the enterprise computing environment 103 can include multiple computing devices arranged in one or more server banks or computer banks. For examples in which the enterprise computing environment 103 includes multiple computing devices, the computing devices can be located in a single installation, or the computing devices can be distributed among multiple different geographical locations.

In some examples, the enterprise computing environment 103 can include computing devices that together form a hosted computing resource or a grid computing resource. In other examples, the enterprise computing environment 103 can operate as an elastic computing resource for which the allotted capacity of computing-related resources, such as processing resources, network resources, and storage resources, can vary over time. In other examples, the enterprise computing environment 103 can include or be operated as one or more virtualized computer instances that can be executed in order to perform the functionality that is described herein.

The enterprise computing environment 103 can include various systems. For example, the enterprise computing environment 103 can include a management service 123 that can monitor and manage the operation of client devices 106 associated with the enterprise that operates the enterprise computing environment 103. In some examples, the management service 123 can manage and oversee the operation of multiple client devices 106 enrolled in a mobile device management service that is provided by the management service 123. The management service 123 can also provide the client devices 106 with access to email, calendar data, contact information, and other resources associated with the enterprise.

The management service 123 can assign various compliance rules to respective client devices 106. The compliance rules can specify, for example, one or more conditions that must be satisfied for a client device 106 to be deemed compliant with the compliance rule. In various examples, the enterprise computing environment 103, a client device 106, or both the enterprise computing environment 103 and a client device 106 can determine whether the client device 106 satisfies a compliance rule.

In one example, a compliance rule can specify that particular applications are prohibited from being installed in a client device 106. As another example, a compliance rule can specify that a client device 106 must be located in a secured location, such as the premises of the enterprise that operates the enterprise computing environment 103, in order for the client device 106 to be authorized to access or render content in the client device 106. In another example, a compliance rule can specify that a lock screen is required to be generated when a client device 106 is "awoken" from a low power "sleep" state and that a passcode is required for a user to unlock the lock screen.

Various compliance rules can be based on time, geographical location, or device and network properties. For instance, a client device 106 can satisfy a compliance rule when the client device 106 is located within a particular geographic location. The client device 106 can satisfy a compliance rule in other examples when the client device 106 is in communication with a particular local area network, such as a particular local area network that is managed by the enterprise computing environment 103. Furthermore, a compliance rule in another example can be satisfied upon the time and date matching specified values.

The client devices 106 can be representative of multiple computing devices that can be coupled to the wide area network 119. Each client device 106 can include a processor-based computer system, such as a desktop computer, a laptop computer, a personal digital assistant, a mobile phone, a tablet computer, a printer, or a scanner.

The client devices 106 can include respective first network interfaces 126a-126c and respective second network interfaces 129a-129c. For the example illustrated in FIG. 1A, each first network interface 126 can facilitate the corresponding client device 106 communicating with the WAN access node 113, and each second network interface 129 can facilitate the corresponding client device 106 communicating with the alternative WAN access node 116. In other words, the first client device 106a can communicate with the WAN access node 113 through the first network interface 126a, and the first client device 106a can communicate with the alternative WAN access node 116 through the second network interface 129a. In other examples, the client devices 106 can communicate with both the WAN access node 113 and the alternative WAN access node 116 through the first network interfaces 126 or the second network interfaces 129.

The client devices 106 can include corresponding management components 133a-133c. A management component 133 can monitor activity and settings in its corresponding client device 106. In addition, a management component 133 can determine whether its corresponding client device 106 satisfies assigned compliance rules. A management component 133 can also configure settings in its corresponding client device 106, such as network configuration parameters.

In some examples, a management component 133 can be a portion of the operating system for a client device 106. In another example, a management component 133 can operate in the application layer of a client device 106. For instance, a management component 133 can be a dedicated application that can monitor and manage data, software components, and hardware components associated with a client device 106.

In other examples, at least a portion of a management component 133 can be a portion of an application that provides functionality in addition to monitoring and managing resources in a client device 106. To this end, the enterprise computing environment 103 can provide a software development kit (SDK) that a developer of an application can use to insert security libraries and other components of a management component 133 into the application. In another approach, the management service 123 or the developer of the application can incorporate libraries and other components of a management component 133 into an application through a process known as "wrapping." To wrap an application, the developer or management service 123 can decompile the application and then insert the libraries into the decompiled application. The developer or management service 123 can then recompile the application with the added security libraries for a management component 133.

When a library for a management component 133 is incorporated into an application, the functionality provided by the library can be invoked by the management component 133 when executed in a client device 106. For example, if a security library provides the ability to monitor and enable or disable functionality provided by an application, a management component 133 can call functions provided by the library to monitor and enable or disable the functionality.

The client devices 106 can also include respective network configuration settings 136a-136c. The network configuration settings 136 for a particular client device 106 can specify network configuration parameters for the client device 106. The LAN access node 109 or a client device 106 can specify the network configuration settings 136 based on the dynamic host configuration protocol (DHCP), which can involve dynamically distributing parameters for the network configuration settings 136. The network configuration settings 136 for a particular client device 106 can specify, for example, a local internet protocol (IP) address, a connection-specific domain name service (DNS) suffix, and the IP address for the specified gateway for the client device 106. The gateway can be a node that can forward packets to devices that are outside of the LAN in which the client device 106 is located. In some examples, the gateway can be specified by the default gateway parameter provided by the ipconfig utility in MICROSOFT operating systems or the ifconfig utility in UNIX-based operating systems. The gateway for a client device 106 can be specified as an IP address for the gateway device. The client device 106 can cause its outbound data packets destined for the wide area network 119 to be routed through the specified gateway.

The client devices 106 can also include respective device status tables 139a-139c. A device status table 139 can represent the client devices 106 in the LAN, the IP addresses of the client devices 106 in the LAN, and an indication of whether each client device 106 is able to access the wide area network 119. As will be described in further detail below, each client device 106 can maintain its respective device status table 139 so that the device status table 139 is updated in response to receiving updated information regarding the client devices 106.

The LAN access node 109 can be a computing device that can facilitate communication between the client devices 106. In addition, the LAN access node 109 can transfer data to and from the wide area network 119. To this end, the LAN access node 109 can include a network switch, hub, router, or bridge. The LAN access node 109 can also serve as a wireless access point for the client devices 106. The client devices 106 can communicate with the LAN access node 109 through their respective first network interfaces 126.

The LAN access node 109 can include a LAN controller 143. The LAN controller 143 can generate configuration data based on the DHCP protocol and provide the configuration data to devices in the LAN served by the LAN access node 109. In addition, the LAN controller 143 can include a DHCP server. The LAN controller 143 can include firmware for the LAN access node 109 that can cause the LAN access node 109 to execute the functionality described herein.

The WAN access node 113 can be a computing device that can facilitate communication between the wide area network 119 and the LAN formed by the LAN access node 109 and client devices 106. The WAN access node 113 can provide a connection to the wide area network 119 for the client devices 106. The WAN access node 113 can include a router, hub, switch, digital subscriber line (DSL) modem, cable modem, or broadband gateway in various examples. Although FIG. 1A depicts the LAN access node 109 as being separate from the WAN access node 113, in alternative examples, the LAN access node 109 and WAN access node 113 can be integrated as a single unit.

The alternative WAN access node 116 can be a computing device or networking system that can facilitate communication between the wide area network 119 and the LAN formed by the LAN access node 109 and client devices 106. The alternative WAN access node 116 can provide an additional connection to the wide area network 119 for the client devices 106, as will be described in further detail below.

In some examples, the alternative WAN access node 116 can include a router, DSL modem, cable modem, or broadband gateway. In other examples, the alternative WAN access node 116 can include a cellular telephony base station, such as a base station for a mobile phone data network. The client devices 106 can communicate with the alternative WAN access node 116 through their respective second network interfaces 129.

Next, examples of the operation of the networked environment 100 are described. The following discussion assumes that the client devices 106 are initially communicating with the wide area network 119 through the WAN access node 113. The following discussion also assumes that the client devices 106 are not communicating with the wide area network 119 through the alternative WAN access node 116.

To facilitate communication between the client devices 106 and the wide area network 119, the LAN controller 143 can generate network configuration data for the respective client devices 106. For example, the network configuration data for the first client device 106a can specify a local IP address, a DNS suffix, and the IP address for the specified gateway for the first client device 106a. For the example illustrated in FIG. 1, the WAN access node 113 can be specified as the gateway for the client devices 106, because the WAN access node 113 can provide a connection to the wide area network 119. To this end, the generated network configuration data can specify that the gateway for the client devices 106 is the device identified by the local IP address of the WAN access node 113.

Once the LAN controller 143 generates the network configuration data for a client device 106, the LAN controller 143 can transmit the network configuration data to the client device 106. In some examples, the LAN controller 143 can push the generated data to the client device 106. In other examples, the client device 106 can request the network configuration data from the LAN controller 143, in accordance with the DHCP protocol.

Once a client device 106 receives its respective network configuration data, the client device 106 can update its network configuration settings 136 in accordance with the received network configuration data. For example, the client devices 106 can update the network configuration settings 136 so that their default gateways are the WAN access node 113, as specified by the received network configuration data. As a result, data packets generated by client devices 106 destined for the wide area network 119 can be routed through the WAN access node 113.

As can be appreciated, the connection to the wide area network 119 provided by the WAN access node 113 can become unavailable for various reasons. For example, a DSL or cable network to which the WAN access node 113 communicates can have a temporary network outage, or the WAN access node 113 can have a hardware or software failure. When the WAN connection provided by the WAN access node 113 is unavailable, the client devices 106 using the WAN access node 113 as their gateways may be unable to access the wide area network 119.

The client devices 106 can detect that the connection to the wide area network 119 provided by the WAN access node 113 is unavailable. For example, a client device 106 can detect the outage upon failing to receive an acknowledgement packet in response to a data packet transmitted by the client device 106. The LAN controller 143 can also detect that the connection to the wide area network 119 provided by the WAN access node 113 is unavailable in various ways. In some examples, a client device 106 or the WAN access node 113 can notify the LAN controller 143 that the connection is unavailable. In another example, the LAN controller 143 can detect that the WAN access node 113 has failed to forward acknowledgement packets, indicating that data packets transmitted by a client device 106 were not received.

In response to detecting that the connection to the wide area network 119 is unavailable, at least one of the client devices 106 can attempt to communicate with the wide area network 119 through its second network interface 129 that communicates with the alternative WAN access node 116. In some examples, a client device 106 can automatically activate its second network interface 129 and attempt to establish communication with the alternative WAN access node 116. In other examples, a user of the client device 106 can request the client device 106 to communicate with the wide area network 119 through the second network interface 129.

Figure 1B:
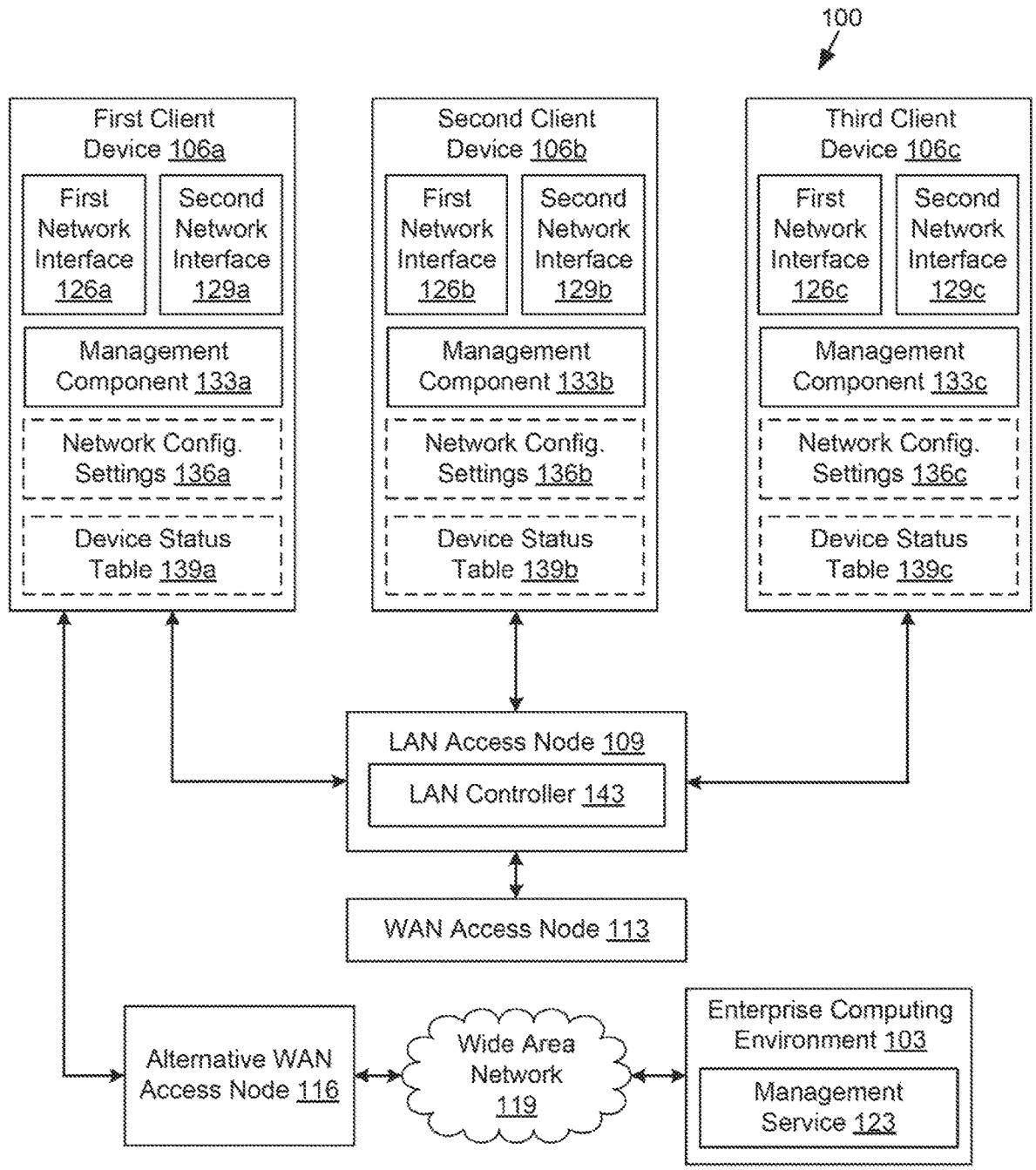

With reference to FIG. 1B, the following description provides examples of approaches for providing the client devices 106 with access to the wide area network 119 despite a failure in the connection to the wide area network 119 provided by the WAN access node 113. FIG. 1B illustrates an example in which the WAN access node 113 is unable to provide a connection to the wide area network 119. In addition, for the example illustrated in FIG. 1B, the first client device 106a has established communication with the wide area network 119 through its second network interface 129a and the alternative WAN access node 116. As discussed above, the alternative WAN access node 116 can include a base station for a cellular telephony network in various examples.

In a first approach of providing the client devices 106 with access to the wide area network 119 through the alternative WAN access node 116, the LAN controller 143 can determine whether the wide area network 119 is accessible to any of the client devices 106. To this end, the LAN controller 143 can request the management component 133 of each client device 106 to provide an indication of whether the wide area network 119 is accessible to its client device 106.

In another example, the LAN controller 143 can request each client device 106 to change the gateway specified in the network configuration settings 136 to be itself. For example, the LAN controller 143 can request the first client device 106a to change its network configuration settings 136a to specify that the gateway for the first client device 106a is the first client device 106a. Once a client device 106 specifies its gateway as being itself, the LAN controller 143 can request the client device 106 to transmit an echo request, or a ping, to a server, such as a DNS server, in the wide area network 119. The client device 106 can then notify the LAN controller 143 whether the client device 106 received a response from the server, which indicates whether the wide area network 119 is accessible to the client device 106 through the alternative WAN access node 116.

Once the LAN controller 143 determines that a particular client device 106 has access to the wide area network 119 through the alternative WAN access node 116, the LAN controller 143 can request each client device 106 to update its network configuration settings 136 to specify that the particular client device 106 is its gateway. Thus, for the example illustrated in FIG. 1B, the LAN controller 143 can request the first client device 106a, the second client device 106b, and the third client device 106c to update their network configuration settings 136 to specify that the first client device 106a is their gateway. To this end, the LAN controller 143 can provide the first client device 106a, second client device 106b, and third client device 106c with network configuration data specifying the local IP address of the first client device 106a. Along with the network configuration data, the LAN controller 143 can request the first client device 106a, second client device 106b, and third client device 106c to modify the network configuration settings 136 as specified in the network configuration data so that the first client device 106a becomes the specified gateway for the first client device 106, second client device 106b, and third client device 106c.

Once the first client device 106a, second client device 106b, and third client device 106c update their configuration settings to specify the first client device 106a as their gateways, the first client device 106a, second client device 106b, and third client device 106c can communicate with the wide area network through the LAN access node 109, first client device 106a, and alternative WAN access node 116. For example, the third client device 106c can transmit a data packet that is forwarded by the LAN access node 109 to the first client device 106a through the first network interface 126a of the first client device 106a. The first network interface 126a can then transfer the data packet to the second network interface 129a and transmit the data packet to the alternative WAN access node 116. Thus, the first client device 106a, second client device 106b, and third client device 106c can communicate with the wide area network 119 through the WAN connection provided by the first client device 106a.

In some examples, multiple client devices 106 may have access to the wide area network 119 through their second network interfaces 129 and the alternative WAN access node 116. In these examples, the LAN controller 143 can use a load balancing algorithm to determine the particular gateways for the respective client devices 106. For example, the LAN controller 143 can use a round robin load balancing algorithm or a least connections load balancing algorithm to determine which client devices 106 are to be used as gateways for the respective client devices 106. Once the LAN controller 143 determines the gateways for the client devices 106, the LAN controller 143 can cause the client devices 106 to update their network configuration settings 136 using one or more of the approaches described above.

A second approach of providing the client devices 106 with access to the wide area network 119 through the alternative WAN access node 116 involves a particular client device 106 acting as a moderator for the client devices 106. In some examples, each client device 106 can periodically share information regarding its local IP address and connectivity status with respect to the wide area network 119. For example, each client device 106 can multicast its IP address and connectivity status. When a client device 106 receives the information, the client device 106 can store the information in its respective device status table 139.

When a client device 106 detects that the WAN connection provided by the WAN access node 113 is unavailable, the client device 106 can consult its device status table 139 and apply a rule to determine which client device 106 is to be the moderator. For example, rules can specify that the particular client device 106 with the highest IP address or the lowest IP address is to be the moderator for the client devices 106. In other examples, an administrator can manually define the client device 106 that is to be the moderator.

Once the client devices 106 identify the moderator, the client devices 106 that are not the moderator can transmit their respective connection statuses to the moderator. In other words, each client device 106 that is not a moderator can provide the moderator with information indicating whether the client device 106 has access to the wide area network 119 through its second network interface 129 and the alternative WAN access node 116. The moderator can then store information indicating the connection statuses of the client devices 106 in its device status table 139.

If the device status table 139 for the moderator indicates that a particular client device 106 is in communication with the wide area network 119 through its second network interface 129, the moderator can request that the client devices 106 change their network configuration settings 136 to specify that the particular client device 106 is their gateway. For the example illustrated in FIG. 1B in which the first client device 106a has a WAN connection through the alternative WAN access node 116, assume the second client device 106b is the moderator. The second client device 106b can change its own network configuration settings 136 so that its specified gateway is the first client device 106a. In addition, the second client device 106b can provide the IP address of the first client device 106a to the first client device 106a and the third client device 106c, so that the first client device 106a and the third client device 106c can update their network configuration settings 136a and 136c to identify the first client device 106a as their gateways. Thus, the first client device 106a, second client device 106b, and third client device 106c can communicate with the wide area network 119 through the WAN connection provided by the first client device 106a.

In some examples, multiple client devices 106 may have access to the wide area network 119 through their second network interfaces 129 and the alternative WAN access node 116. In these examples, the moderator can use a load balancing algorithm to determine the particular gateways for the respective client devices 106. For example, the moderator can use a round robin load balancing algorithm or a least connections load balancing algorithm to determine which client devices 106 are to be used as gateways for the respective client devices 106. Once the gateways are determined, the moderator can cause the client devices 106 to update their network configuration settings 136 using one or more of the techniques described above.

In some examples, the entity that provides WAN access through the alternative WAN access node 116 can charge the user of the first client device 106a a fee based on the amount of data that the first client device 106a sends or receives through the alternative WAN access node 116. The management component 133a in the first client device 106a can track the amount of data that originates or is destined for the first client device 106a, the second client device 106b, and the third client device 106c, respectively, and report the tracked data usage to the management service 123. The management service 123 can then facilitate reimbursement of the fee for data usage that corresponds to the second client device 106b and third client device 106c, respectively, based on the reported data usage.

Figure 2:
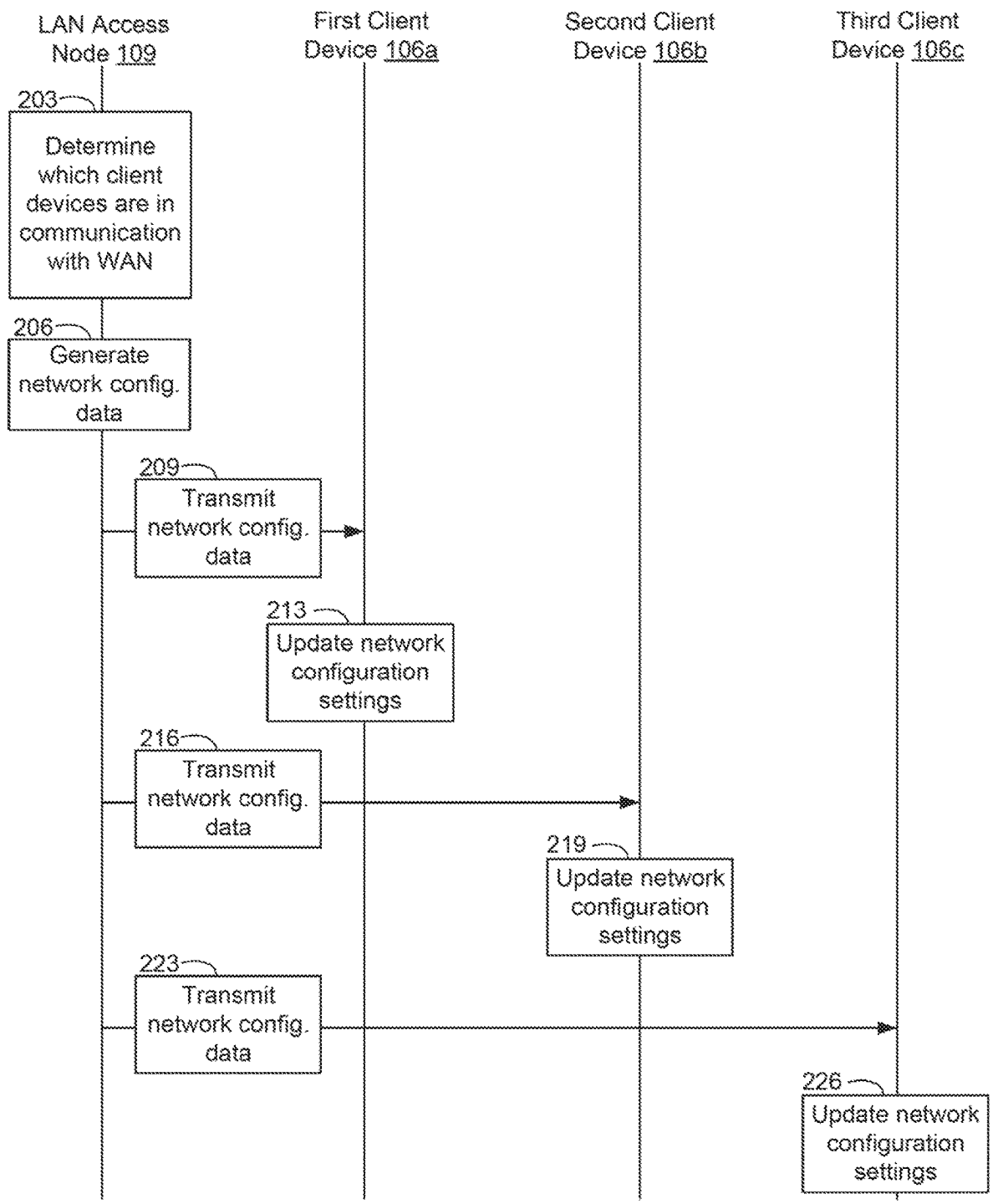
FIGS. 2 and 3A-3B show sequence diagrams illustrating examples of component interaction.

With reference to FIG. 2, shown is a sequence diagram illustrating an example of interactions of components in the networked environment 100. The sequence diagram of FIG. 2 illustrates an example of the LAN access node 109 providing the client devices 106 with network configuration data for the network configuration settings 136.

Beginning with step 203, the LAN access node 109 can determine which client devices 106 are in communication with the wide area network 119. To this end, the LAN access node 109 can request each client device 106 to provide an indication of whether the wide area network 119 is accessible to its client device 106. In another example, the IAN access node 109 can request each client device 106 to change the gateway specified in the network configuration settings 136 to be itself and attempt to ping a DNS server. The client devices 106 can then notify the LAN access node 109 whether the wide area network 119 is accessible to the client device 106 through the alternative WAN access node 116 based on the results of the attempts to ping the DNS server.

As shown at step 206, the LAN access node 109 can then generate network configuration data for the client devices 106. In particular, the network configuration data can identify the IP address of a client device 106 that has access to the wide area network 119. In addition, the network configuration data can specify that the gateway for the client devices 106 is to be the client device 106 with access to the wide area network 119.

At step 209, the LAN access node 109 can transmit the network configuration data to the first client device 106a. Upon receiving the data, the first client device 106a can update its network configuration settings 136a as specified by the network configuration data, as shown at step 213. As a result, the specified gateway for the first client device 106a can be the client device 106 having access to the wide area network 119.

Similarly, at step 216, the LAN access node 109 can transmit the network configuration data to the second client device 106b. The second client device 106b can then update its network configuration settings 136b as specified by the received data, as shown at step 219. Thus, the specified gateway for the second client device 106b can be the client device 106 having access to the wide area network 119.

In addition, at step 223, the LAN access node 109 can transmit the network configuration data to the third client device 106c. The third client device 106c can then update its network configuration settings 136c in accordance with the received data, as indicated at step 226. Thus, the specified gateway for the third client device 106c can be the client device having access to the wide area network 119. Thereafter, the process can end.

Figure 3A:
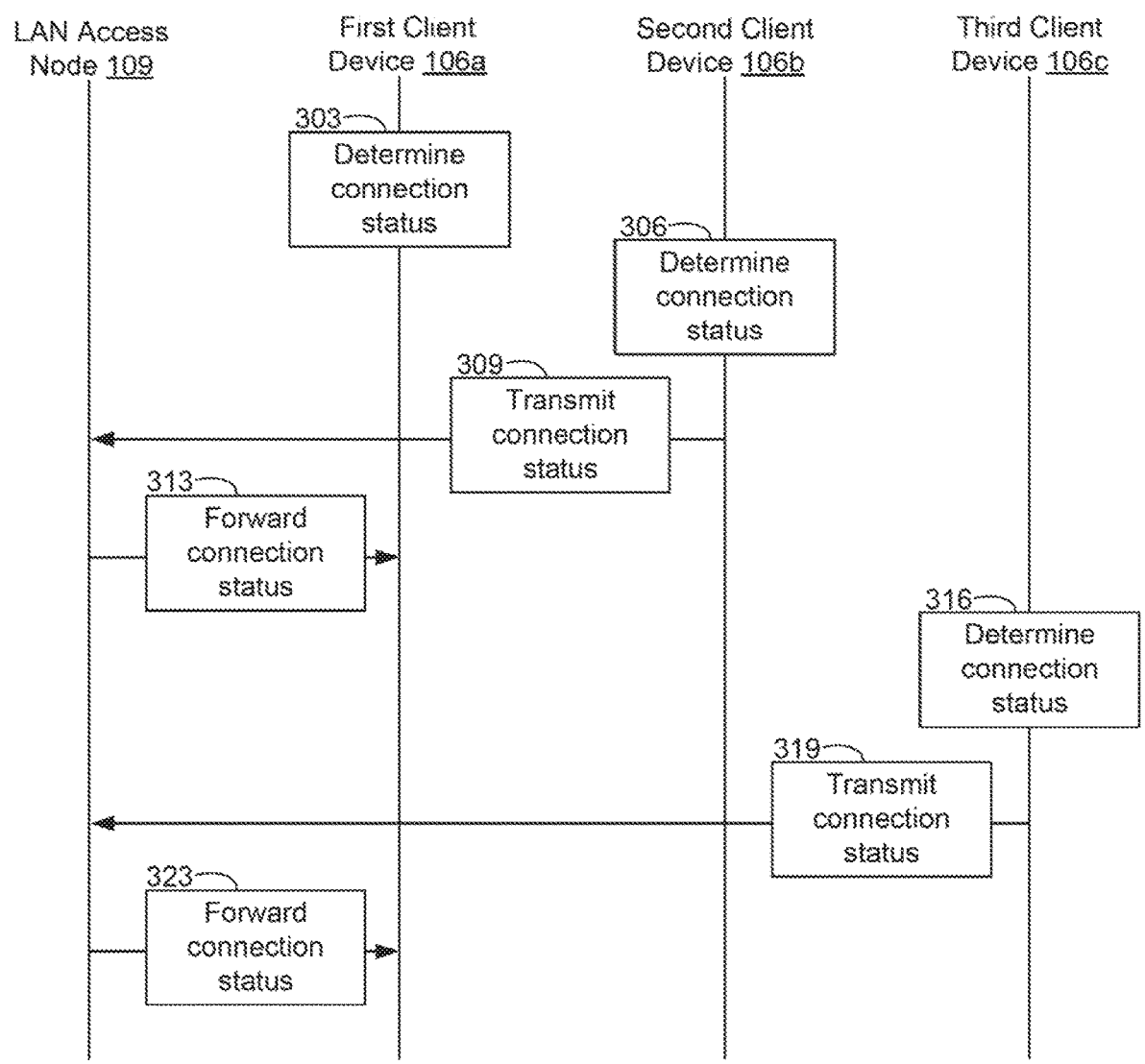
Figure 3B:
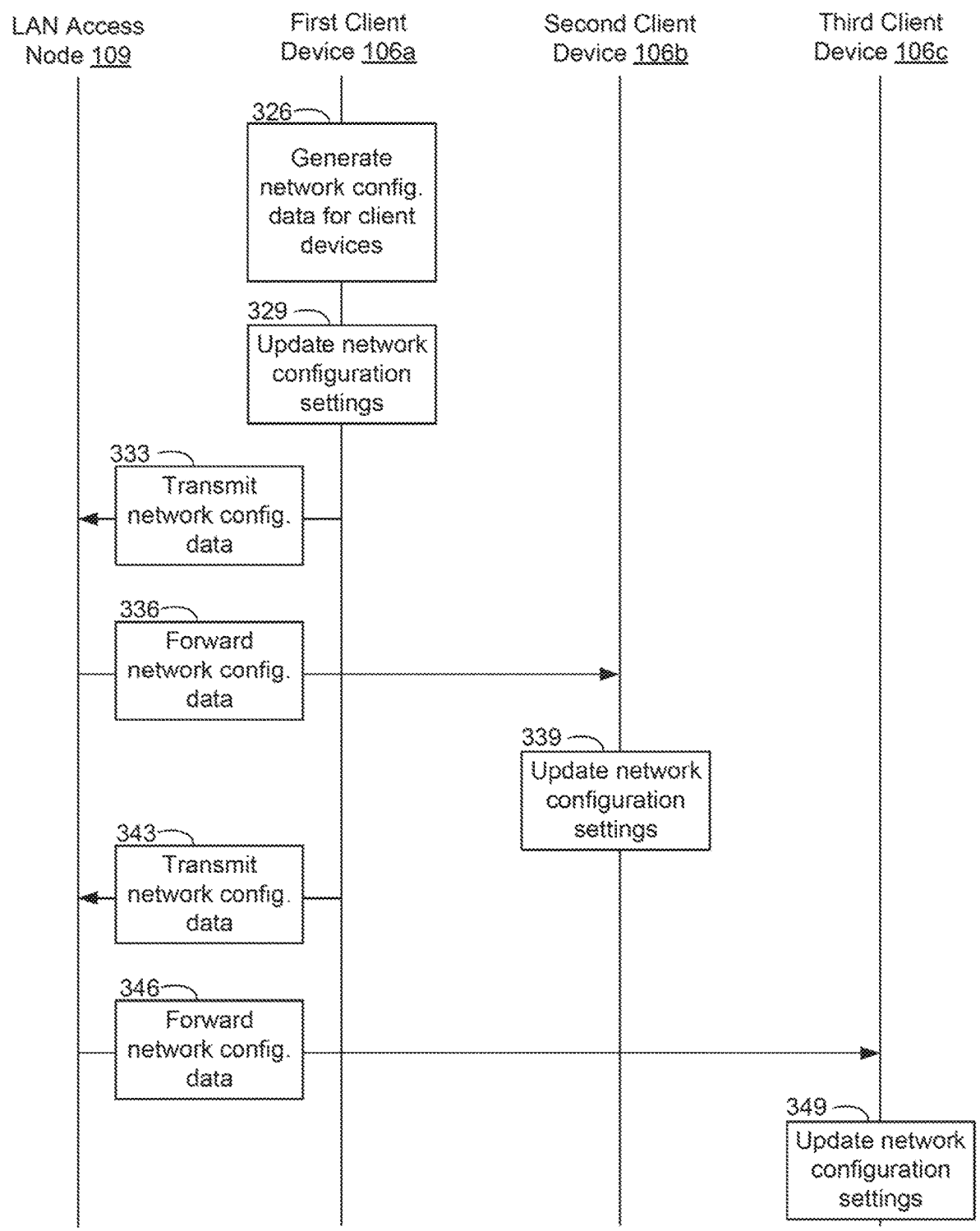

With reference to FIGS. 3A-3B, shown is a sequence diagram illustrating another example of interactions of components in the networked environment 100. The sequence diagram of FIGS. 3A-3B illustrates an example of the first client device 106a acting as a moderator for the client devices 106 and providing the client devices 106 with network configuration data for the network configuration settings 136.

Beginning with step 303, the first client device 106a can determine whether it has access to the wide area network 119 through its second network interface 129a. To this end, the first client device 106a can attempt to ping a DNS server, as described above.

At step 306, the second client device 106b can determine whether it has access to the wide area network 119 through its second network interface 129b. Then, at step 309, the second client device 106b can transmit data representing its connection status to the LAN access node 109. At step 313, the LAN access node 109 can then forward the connection status data to the first client device 106a, which is the moderator in the example illustrated in FIGS. 3A-3B.

Similarly, the third client device 106c can determine whether it has access to the wide area network 119 through its second network interface 129c, as shown at step 316. The third client device 106c can then transmit data representing the connection status to the LAN access node 109, as indicated at step 319. The LAN access node 109 can then forward the connection status to the first client device 106a, as shown at step 323.

At step 326, which is shown in FIG. 3B, the first client device 106a, which is the moderator in the present example, can generate network configuration data for the client devices 106a-106c. As discussed above, the network configuration data can include the IP address of a client device that has a connection to the wide area network 119 through its second network interface 129.

As shown at step 329, the first client device 106a can then update its network configuration settings 136a, as specified by the network configuration data. In particular, the network configuration settings 136a can indicate that the gateway for the first client device 106a is the client device 106 having access to the wide area network 119, as identified by its IP address specified in the network configuration data.

Then, at step 333, the first client device 106a can transmit the network configuration data to the LAN access node 109, which can forward the data to the second client device 106b, as shown at step 336. Upon receiving the network configuration data, the second client device 106b can update its network configuration settings 136b, as shown at step 339. In particular, the network configuration settings 136b can specify that the gateway for the second client device 106b is the client device 106 having access to the wide area network 119, as identified in the network configuration data.

At step 343, the first client device 106a can transmit the network configuration data to the LAN access node 109, which can forward the data to the third client device 106c, as shown at step 346. Upon receiving the network configuration data, the third client device 106c can update its network configuration settings 136c, as shown at step 349. In particular, the network configuration settings 136c can specify that the gateway for the third client device 106c is the client device 106 having access to the wide area network 119, as identified in the network configuration data. Thereafter, the process can end.

Figure 4:
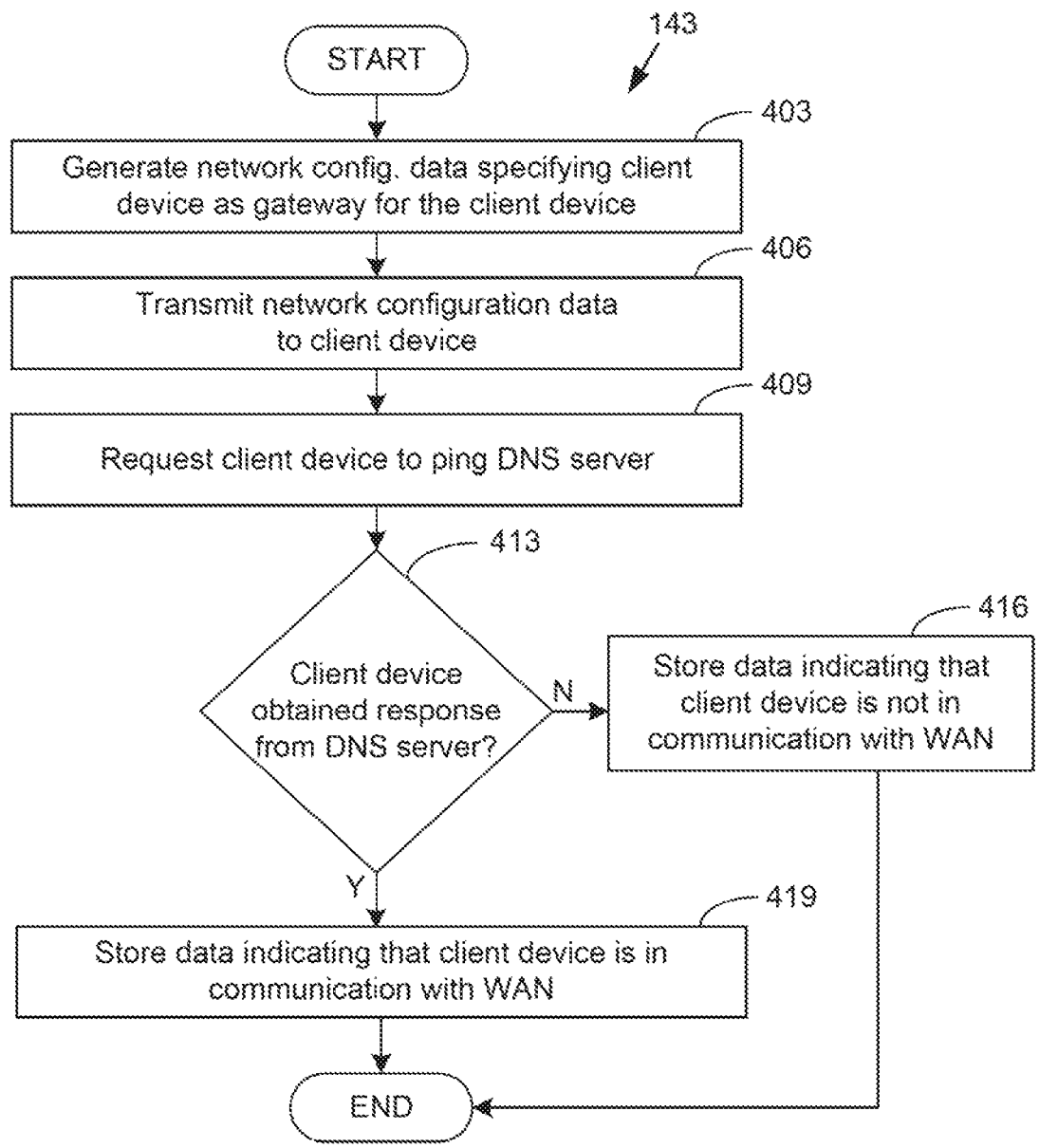
FIGS. 4-5 show flowcharts illustrating an example of functionality implemented by a local area network access node.

With reference to FIG. 4, shown is a flowchart that provides an example of a portion of the operation of the LAN controller 143. In particular, FIG. 4 provides an example of the LAN controller 143 determining whether a client device 106 is in communication with the wide area network 119 through its second network interface 129 and the alternative WAN access node 116. The flowchart of FIG. 4 can be viewed as depicting an example of a method implemented in the LAN access node 109.

Beginning with step 403, the LAN controller 143 can generate network configuration data specifying that the client device 106 is the gateway for the client device 106. For example, if the LAN controller 143 is determining whether the first client device 106a has access to the wide area network 119, the LAN controller 143 can generate network configuration data specifying that the first client device 106a is the gateway for the first client device 106a. At step 406, the LAN controller 143 can transmit the generated data to the client device 106 to cause the client device 106 to update its network configuration settings 136 as specified by the network configuration data.

Then, as shown at step 409, the LAN controller 143 can request the client device 106 to ping a DNS server. The LAN controller 143 can then move to step 413 and determine whether the client device 106 received a response from the DNS server. For example, the client device 106 can notify the LAN controller 143 whether the client device 106 received an echo packet from the DNS server. If the client device 106 did not obtain a response from the DNS server, the LAN controller 143 can store data indicating that the client device 106 is not in communication with the wide area network 119 through its second network interface 129 and the alternative WAN access node 116, as shown at step 416. Otherwise, if the client device 106 did obtain a response from the DNS server, the LAN controller 143 can store data indicating that the client device 106 is in communication with the wide area network 119 through its second network interface 129 and the alternative WAN access node 116, as indicated at step 419. Thereafter, the process can end.

Figure 5:
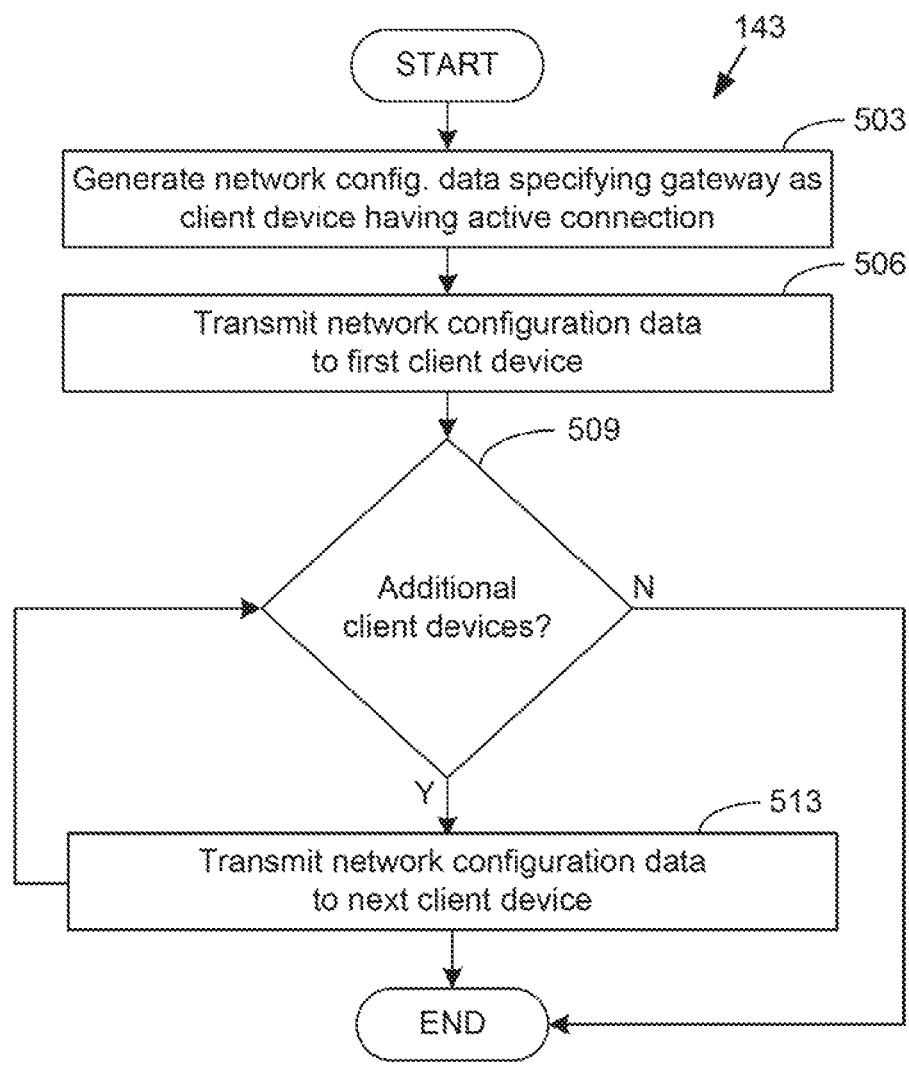

With reference to FIG. 5, shown is a flowchart that provides another example of a portion of the operation of the LAN controller 143. In particular, FIG. 5 provides an example of the LAN controller 143 providing client devices 106 with network configuration data so that the gateway for the client devices 106 is a client device 106 with an active WAN connection. The flowchart of FIG. 5 can be viewed as depicting an example of a method implemented in the LAN access node 109.

Beginning at step 503, the LAN controller 143 can generate network configuration data specifying the gateway as being a client device 106 having an active WAN connection. The network configuration data can identify the client device 106 by its local IP address in various examples.

At step 506, the LAN controller 143 can transmit the generated network configuration data to the first client device 106a. The transmitted network configuration data can be forwarded to the first client device 106a by the LAN access node 109.

The LAN controller 143 can then determine whether there are additional client devices 106 for which the LAN controller 143 is to provide the network configuration data, as shown at step 509. The client devices 106 for which the LAN controller 143 is to provide network configuration data can be all of the client devices 106 that are in communication with the LAN access node 109.

If there are additional client devices 106 for which the LAN controller 143 is to provide network configuration data, the LAN controller 143 can move to step 513 and transmit the network configuration data to the next client device 106. This process can continue as shown in FIG. 5, until there are no additional client devices 106 for which the LAN controller 143 is to provide network configuration data. Thereafter, the process can end.

Figure 6:
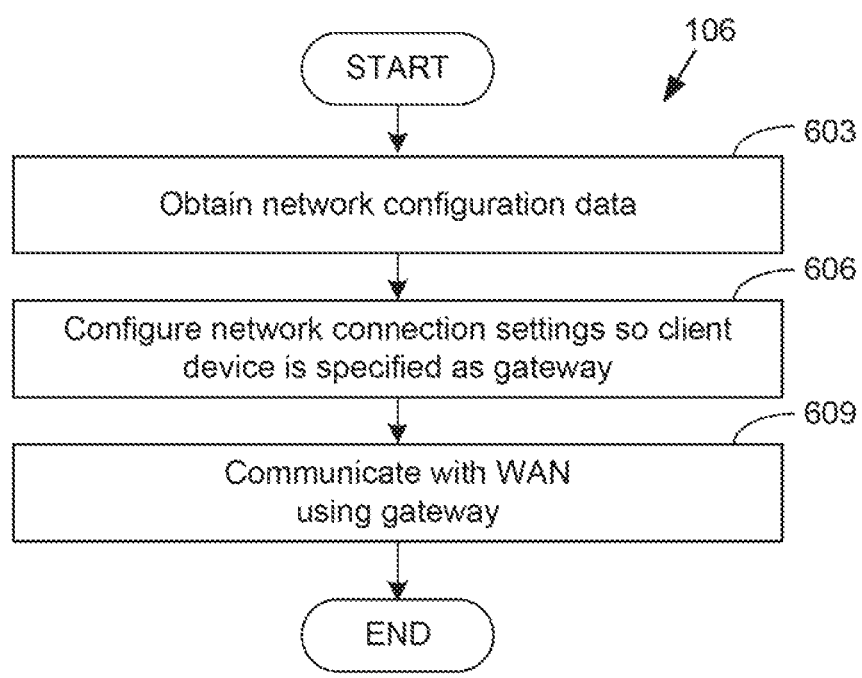
FIGS. 6, 7, and 8A-8B show flowcharts illustrating examples of functionality implemented by a client device.

With reference to FIG. 6, shown is a flowchart that provides an example of a portion of the operation of a client device 106. In particular, FIG. 6 provides an example of a client device 106 specifying its gateway based on received network configuration data. The flowchart of FIG. 6 can be viewed as depicting an example of a method implemented in a client device 106. In various examples, the operation of the client device 106 described with respect to FIG. 6 can be performed by, or under the direction of, a management component 133.

Beginning with step 603, the client device 106 can obtain network configuration data. In various examples, the client device 106 can obtain the network configuration data from the LAN access node 109 or another client device 106. The received network configuration data can include gateway data that specifies the IP address of a device that is to be the gateway for the client device 106.

As shown at step 606, the client device 106 can configure its network configuration settings so that its gateway is the client device 106 having the IP address specified in the received network configuration data. To this end, the client device 106 can execute the ipconfig utility in MICROSOFT operating systems or the ifconfig utility in UNIX-based operating systems and update the default gateway parameter to be the IP address specified in the received network configuration data.

As shown at step 609, the client device 106 can then communicate with the wide area network 119 using the gateway specified in the received network configuration data. For example, data transmitted by the client device 106 that is destined for the wide area network 119 can be forwarded to the particular client device 106 that is specified as the gateway. Thereafter, the process can end.

Figure 7:
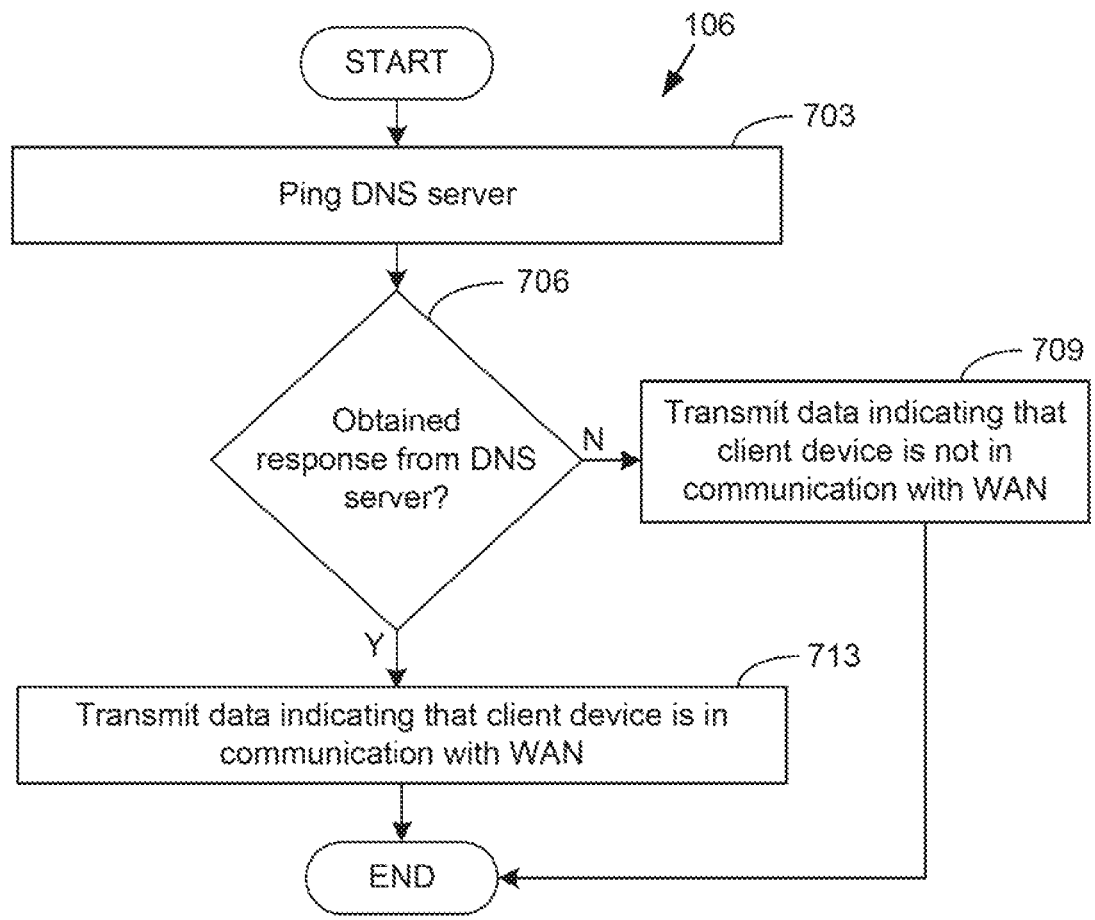

With reference to FIG. 7, shown is a flowchart that provides an example of a portion of the operation of a client device 106. In particular, FIG. 7 provides an example of a client device 106 determining whether it is in communication with the wide area network 119. The flowchart of FIG. 7 can be viewed as depicting an example of a method implemented in a client device 106. In various examples, the operation of the client device 106 described with respect to FIG. 7 can be performed by, or under the direction of, a management component 133.

Beginning with step 703, the client device 106 can ping a DNS server. In other words, the client device 106 can transmit an echo request to a DNS server. If the DNS server receives the ping, the DNS server can respond to the ping.

Thus, at step 706, the client device 106 can determine whether it obtained a response from the DNS server. If the client device 106 did not receive a response from the DNS server, the client device 106 can transmit data indicating that the client device 106 is not in communication with the wide area network 119, as shown at step 709. In various examples, the client device 106 can transmit the data to the LAN access node 109 or a client device 106 that is acting as a moderator for a LAN.

If the client device 106 did obtain a response from the DNS server, the client device 106 can move to step 713 and transmit data indicating that the client device is in communication with the wide area network 119. In various examples, the client device 106 can transmit the data to the LAN access node 109 or a client device 106 that is acting as a moderator for a LAN. Thereafter, the process can end.

Figure 8A:
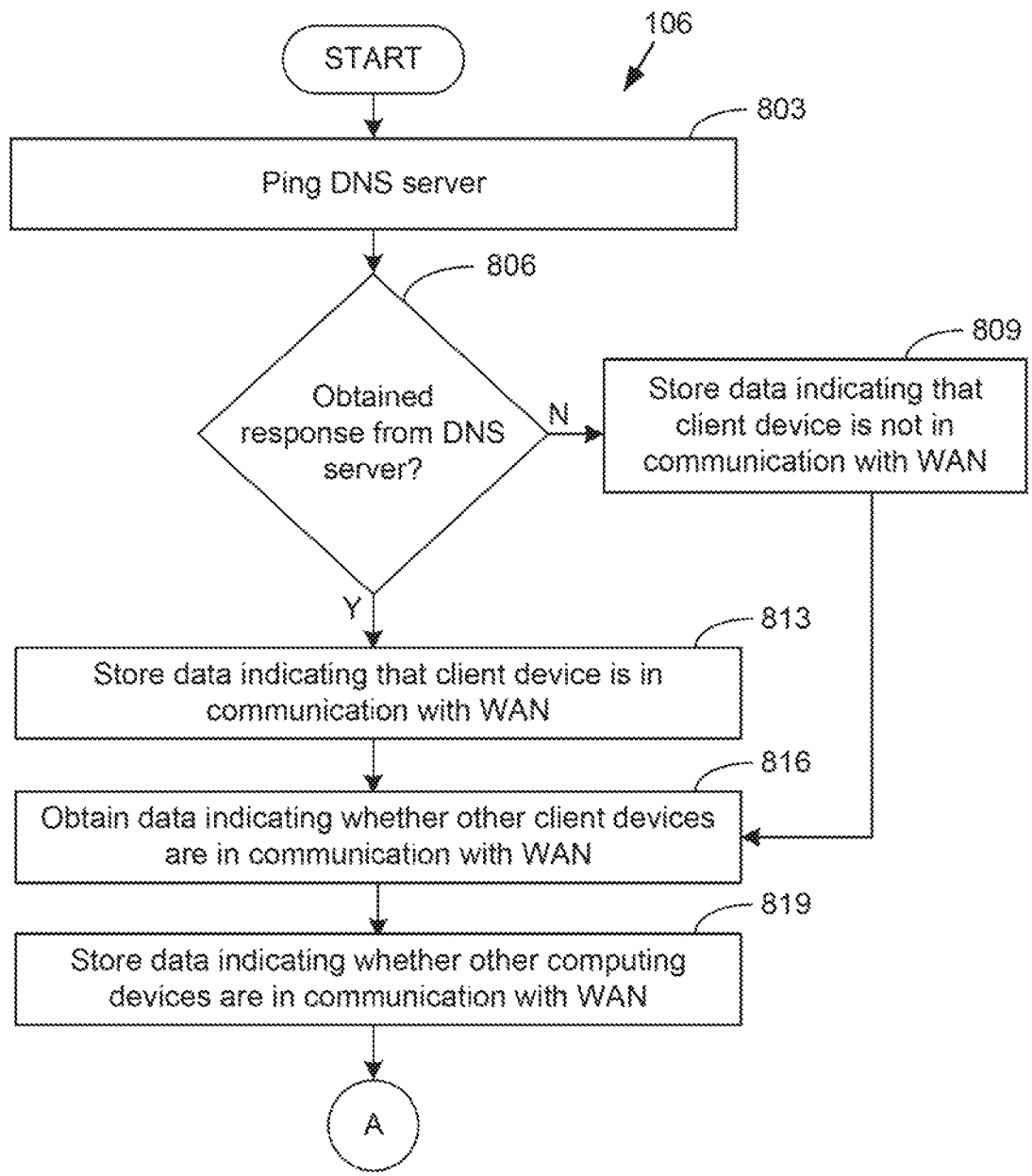
Figure 8B:
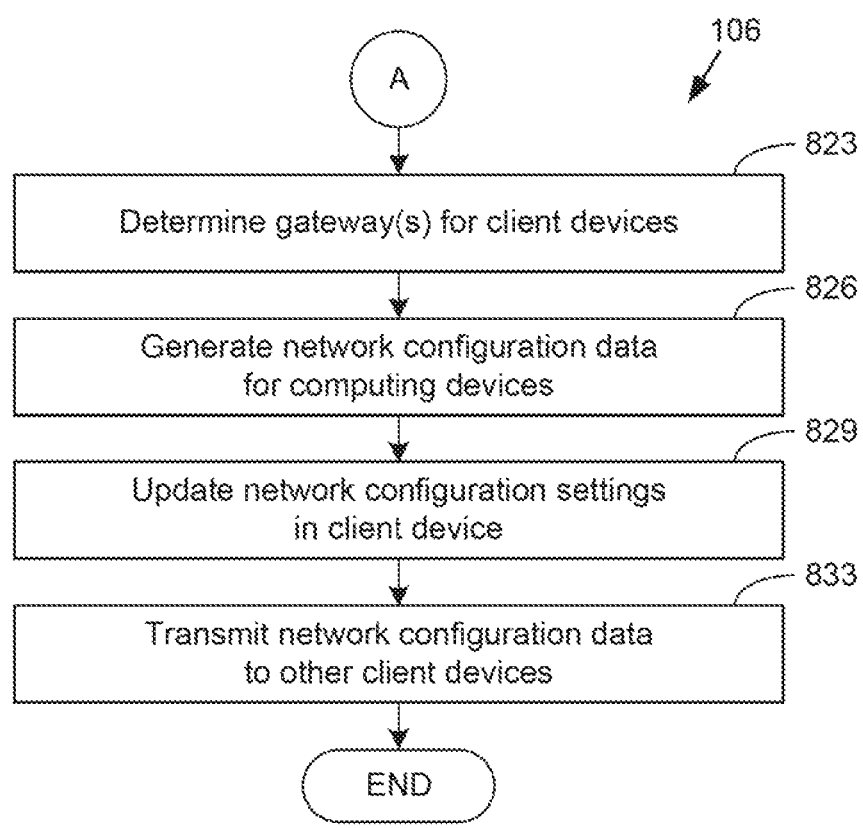

With reference to FIGS. 8A-8B, shown is a flowchart that provides another example of a portion of the operation of a client device 106. In particular, FIGS. 8A-8B provide an example of a client device 106 serving as a moderator and providing network configuration data to other client devices 106. The flowchart of FIGS. 8A-8B can be viewed as depicting an example of a method implemented in a client device 106. In various examples, the operation of the client device 106 described with respect to FIGS. 8A-8B can be performed by, or under the direction of, a management component 133.

Beginning with step 803, the client device 106 can ping a DNS server. If the DNS server receives the ping, the DNS server can respond to the ping with echo data. At step 806, the client device 106 can determine whether it obtained a response from the DNS server. If the client device 106 did not receive a response from the DNS server, the client device 106 can store data indicating that the client device 106 is not in communication with the wide area network 119, as shown at step 809. If the client device 106 did obtain a response from the DNS server, the client device 106 can move to step 813 and store data indicating that the client device is in communication with the wide area network 119.

As shown at step 816, the client device 106 can then obtain data indicating whether the other client devices 106 are in communication with the wide area network 119. For example, the other client devices 106 can use the approach described with respect to FIG. 7 to notify the moderator client device 106 of their respective connection statuses. Then, the client device 106 can store the data indicating whether the other client devices 106 are in communication with the wide area network 119, as shown at step 819. In this way, the client device 106 can populate and maintain its device status table 139.

The client device 106 can then move to step 823, which is shown in FIG. 8B. At step 823, the client device 106 can determine the gateways for the client devices 106. For examples in which a single client device 106 has access to the wide area network 119 though the alternative WAN access node 116, the client device 106 can determine that the gateway for all of the client devices 106 is the single client device 106 having WAN connectivity. For examples in which multiple client devices 106 have access to the wide area network 119 though the alternative WAN access node 116, the client device 106 can apply a load balancing algorithm to determine which client devices 106 having WAN connectivity will serve as gateways for the respective client devices 106.

At step 826, the client device 106 can generate network configuration data for the client devices 106. In particular, the network configuration data can specify the IP address of a client device 106 having WAN connectivity. For examples in which a single client device 106 has access to the wide area network 119 though the alternative WAN access node 116, the network configuration data for all client devices 106 can specify the IP address of the single client device 106 having WAN connectivity. For examples in which multiple client devices 106 have access to the wide area network 119 though the alternative WAN access node 116, the network configuration data for each client device 106 can specify the IP address of the corresponding client device 106 that is to serve as its gateway. As described above, the network configuration data can be based on the DHCP protocol.

As shown at step 829, the client device 106 can update its own network configuration settings 136. For example, the client device 106 can execute the ipconfig utility in MICROSOFT operating systems or the ifconfig utility in UNIX-based operating systems and update the default gateway parameter to be the IP address specified in its network configuration data. The can cause outbound data packets to enter the wide area network 119 through the client device 106 that is serving as a gateway.

At step 833, the client device 106 can transmit the network configuration data to the other client devices 106. In some examples, the client device 106 can push the network configuration data to the other client devices 106. In other examples, the client device 106 can transmit the network configuration data to the other client devices 106 in response to requests from the other client devices 106. Thereafter, the process can end.

The sequence diagrams and flowcharts discussed above show examples of the functionality and operation of implementations of components described herein. The components of the networked environment 100 described herein can be embodied in hardware, software, or a combination of hardware and software. If embodied in software, each step in the sequence diagrams and flowcharts can represent a module or a portion of code that includes computer instructions to implement the specified logical functions. The computer instructions can include source code that comprises human-readable statements written in a programming language or machine code that comprises machine instructions recognizable by a suitable execution system, such as a processor in a computer system. If embodied in hardware, each step can represent a circuit or a number of interconnected circuits that implement the specified logical functions.

Although the sequence diagrams and flowcharts discussed above show a specific order of execution, the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid.

The enterprise computing environment 103, client devices 106, LAN access node 109, WAN access node 113, and alternative WAN access node 116 can each include at least one processing circuit. Such a processing circuit can include one or more processors and one or more storage devices that are coupled to a local interface. The local interface can include a data bus with an accompanying address/control bus.

A storage device for a processing circuit can store data and components that are executable by the one or more processors of the processing circuit. In some examples, at least portions of functional components can be stored in one or more storage devices and be executable by one or more processors.

Components described herein can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that include software or computer instructions can be embodied in any non-transitory computer-readable medium for use by or in connection with an instruction execution system such as, for example, a processor in a computer system or other system. Such a computer-readable medium can contain, store, and maintain the software and computer instructions for use by or in connection with the instruction execution system.

A computer-readable medium can comprise a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

What is claimed is:

1. A method, comprising:
    determining, by a first client device of a plurality of client devices, that the first client device is a moderator that provides gateway configurations to maintain connectivity of the plurality of client devices to a wide area network, the moderator being determined based on a rule that identifies the moderator based on Internet protocol (IP) addresses for the plurality of client devices;
    determining, by the first client device, that the wide area network is inaccessible through a first network connection provided by a network access node;
    transmitting, by the first client device to a second client device of the plurality of client devices, a request to ping a specified domain name service (DNS) server in the wide area network;
    determining, by the first client device, that the wide area network is accessible through the second client device, the second client device providing a second network connection to the wide area network, wherein the first client devices determines that the wide area network is accessible through the second client device based on an indication that the second client device successfully pings the specified DNS server;
    generating, by the first client device, gate configuration data for a particular client device of the plurality of client devices, wherein the gateway configuration data configures the second client device to be a gateway to the wide area network based on a local IP address for the second client device; and
    transmitting, by the first client device, the gateway configuration data to the particular client device to cause the particular client device to use the second client device as the gateway to the wide area network.

2. The method of claim 1, further comprising maintaining, by the first client device, a status table comprising data that represents a plurality of network connection statuses for the plurality of client devices, a respective network connection status indicating that a respective client device successfully pings a DNS server, wherein the status table is stored in a storage device of the moderator.

3. The method of claim 1, further comprising determining, by the first client device, that the second client device is the gateway for the particular client device based on a load balancing algorithm.

4. The method of claim 1, wherein the rule identities the moderator based on one of: an IP address of the first client device being a lowest IP address of the IP addresses of the plurality of client devices, or an IP address of the first client device being a highest IP address of the IP addresses of the plurality of client devices.

5. The method of claim 1, further comprising:
    determining that the wide area network is accessible through the first network connection provided by the network access node;
    generating updated gateway configuration data for the particular client device; and
    transmitting the updated gateway configuration data to the particular client device to cause the particular client device to use the network access node as the gateway.

6. The method of claim 1, further comprising:
    determining that the wide area network is accessible through a third network connection provided by a third client device;
    generating additional gateway configuration data for a fourth client device based on an additional address for the third client device; and
    transmitting the gateway configuration data to the fourth client device to cause the fourth client device to use the third client device as a gateway.

7. The method of claim 1, further comprising:
    transmitting, by the first client device to the second client device, a request to change a gateway configuration of the second client device to specify the second client device as its own gateway.

8. A system, comprising:
    a first client device;
    at least one storage device storing a plurality of computer instructions executable by the first client device, wherein the plurality of computer instructions cause the first client device to at least:
        determine that the first client device is a moderator that provides gateway configurations to maintain connectivity of a plurality of client devices to a wide area network, the moderator being determined based on a rule that identifies the moderator based on Internet protocol (IP) addresses for the plurality of client devices, wherein the plurality of client devices comprises the first client device;
        determine that the wide area network is inaccessible through a first network connection provided by a network access node;
        transmit, to a second client device of the plurality of client devices, a request to ping a specified domain name service (DNS) server in the wide area network;

determine by the first client device, that the wide area network is accessible through the second client device, the second client device providing a second network connection to the wide area network, wherein the first client devices determines that the wide area network is accessible through the second client device based on an indication that the second client device successfully pings the specified DNS server;

generate gateway configuration data for a particular client device of the plurality of client devices, wherein the gateway configuration data configures the second client device to be a gateway to the wide area network based on a local IP address for the second client device; and transmit the gateway configuration data to the particular client device to cause the particular client device to use the second client device as the gateway to the wide area network.

9. The system of claim 8, wherein the plurality of computer instructions further cause the first client device to at least maintain a status table comprising data that represents a plurality of network connection statuses for the plurality of client devices, a respective network connection status indicating that a respective client device successfully pings a DNS server, wherein the status table is stored in a storage device of the moderator.

10. The system of claim 8, wherein the plurality of computer instructions further cause the first client device to at least determine that the second client device is the gateway for the particular client device based on a load balancing algorithm.

11. The system of claim 8, wherein the rule identifies the moderator to be the first client device based on one of: an IP address of the first client device being a lowest IP address of the IP addresses of the plurality of client devices, or an IP address of the first client device being a highest IP address of the IP addresses of the plurality of client devices.

12. The system of claim 8, wherein the plurality of computer instructions further cause the first client device to at least:

determine that the wide area network is accessible through the first network connection provided by the network access node;

generate updated gateway configuration data for the particular client device; and transmit the updated gateway configuration data to the particular client device to cause the particular client device to use the network access node as the gateway.

13. The system of claim 8, wherein the gateway configuration data comprises dynamic host configuration protocol (DHCP) data.

14. A non-transitory computer-readable medium storing a plurality of computer instructions executable by a first client device, wherein the plurality of computer instructions cause the first client device to at least:

determine that the first client device is a moderator that provides gateway configurations to maintain connectivity of a plurality of client devices to a wide area network, the moderator being determined based on a rule that identifies the moderator based on Internet protocol (IP) addresses for the plurality of client devices, wherein the plurality of client devices comprises the first client device;

determine that the wide area network is inaccessible through a first network connection provided by a network access node;

transmit, to a second client device of the plurality of client devices, a request to ping a specified domain name service (DNS) server in the wide area network;

determine by the first client device, that the wide area network is accessible through the second client device, the second client device providing a second network connection to the wide area network, wherein the first client devices determines that the wide area network is accessible through the second client device based on an indication that the second client device successfully pings the specified DNS server;

generate gateway configuration data for a particular client device of the plurality of client devices, wherein the gateway configuration data configures the second client device to be a gateway to the wide area network based on a local IP address for the second client device; and transmit the gateway configuration data to the particular client device to cause the particular client device to use the second client device as the gateway to the wide area network.

15. The non-transitory computer-readable medium of claim 14, wherein the plurality of computer instructions further cause the first client device to at least maintain a status table comprising data that represents a plurality of network connection statuses for the plurality of client devices, a respective network connection status indicating that a respective client device successfully pinged a DNS server, wherein the status table is stored in a storage device of the moderator.

16. The non-transitory computer-readable medium of claim 14, wherein the plurality of computer instructions further cause the first client device to at least determine that the second client device is the gateway for the particular client device based on a load balancing algorithm.

17. The non-transitory computer-readable medium of claim 14, wherein the rule identifies the moderator to be the first client device based on one of: an IP address of the first client device being a lowest IP address of the IP addresses of the plurality of client devices, or an IP address of the first client device being a highest IP address of the IP addresses of the plurality of client devices.

18. The non-transitory computer-readable medium of claim 14, wherein the plurality of computer instructions further cause the first client device to at least:

determine that the wide area network is accessible through the first network connection;

generate updated gateway configuration data for the particular client device; and transmit the updated gateway configuration data to cause the particular client device to use the network access node as the gateway.

19. The non-transitory computer-readable medium of claim 14, wherein the gateway configuration data comprises dynamic host configuration protocol (DHCP) data.

20. The non-transitory computer-readable medium of claim 16, wherein the load balancing algorithm is one of: a round robin load balancing algorithm or a least connections load balancing algorithm.

* * * * *